United States Patent [19]

Orii

[11] Patent Number: 4,767,639
[45] Date of Patent: Aug. 30, 1988

[54] BAKING APPARATUS AND PROCESS
[75] Inventor: Masaru Orii, Tokyo, Japan
[73] Assignee: Kabushikigaisha Orii, Kanagawa, Japan
[21] Appl. No.: 83,637
[22] Filed: Aug. 7, 1987
[30] Foreign Application Priority Data Aug. 11, 1986 [JP] Japan .................... 61-188188

[51] Int. Cl.$^4$ .................... A23C 3/00; A21B 1/00
[52] U.S. Cl. .................... 426/523; 126/19 R; 99/443 R; 34/189
[58] Field of Search ............ 126/19 R, 19 M, 21 R; 34/189, 190, 194, 203, 204; 219/388; 99/443 C, 443 R, 353, 356; 432/121, 125, 126; 198/465.1, 468.6, 775; 426/523

[56] References Cited

U.S. PATENT DOCUMENTS

| 847,786 | 3/1907 | Koepff | 34/190 |
| 1,881,063 | 10/1932 | Randolf | 34/189 |
| 4,100,848 | 7/1978 | Grissinger | 99/353 |

Primary Examiner—Samuel Scott
Assistant Examiner—Noah P. Kamen
Attorney, Agent, or Firm—Collard, Roe & Galgano

[57] ABSTRACT

A baking apparatus including an oven having an inlet and an outlet through which pans are taken into and out of the oven is disclosed. Stationary pan receiving members are vertically arranged in multiple layers in the oven. First and second vertical feed members are provided on each side of the stationary multiple-layer pan receiving members. Movable pan receiving members are rigidly secured in multiple layers to the first and second vertical feed members at intervals twice as large as those of the stationary pan receiving members. Lateral feed members are provided to feed the pans laterally when the movable pan receiving members are aligned horizontally with the stationary pan receiving members, whereby the pans are made to move up or down in a zigzag pattern and pass the heat sources while they are moving horizontally, thus enabling the oven to be designed to have a vertical structure.

9 Claims, 6 Drawing Sheets

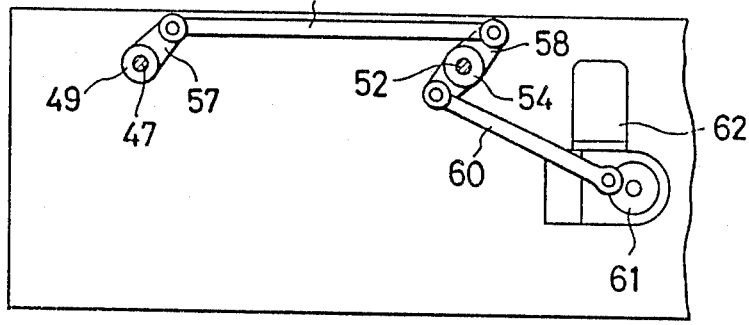
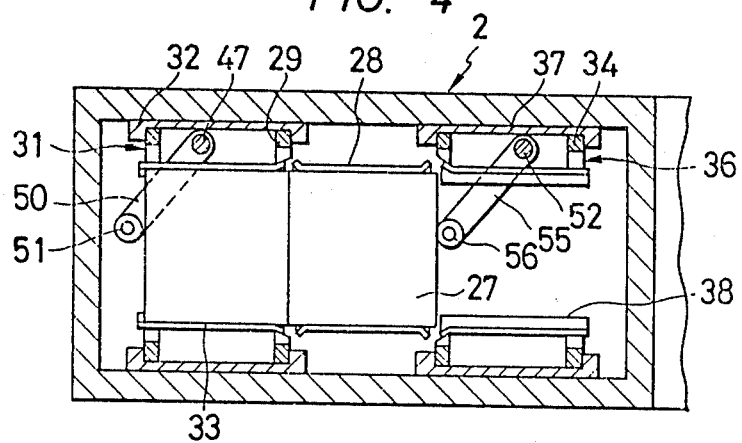
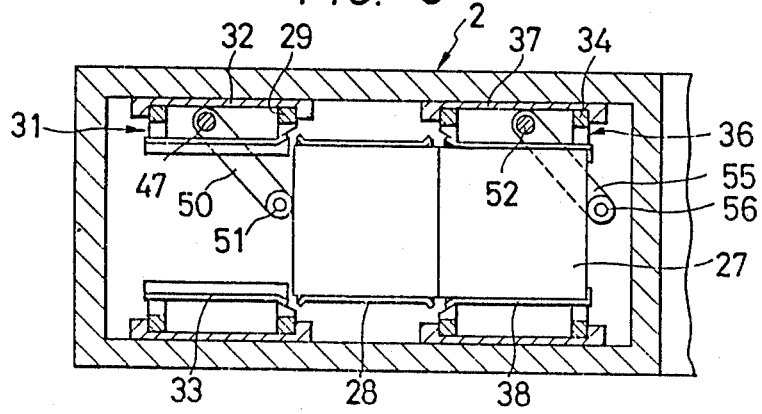

FIG. 9
FIG. 10
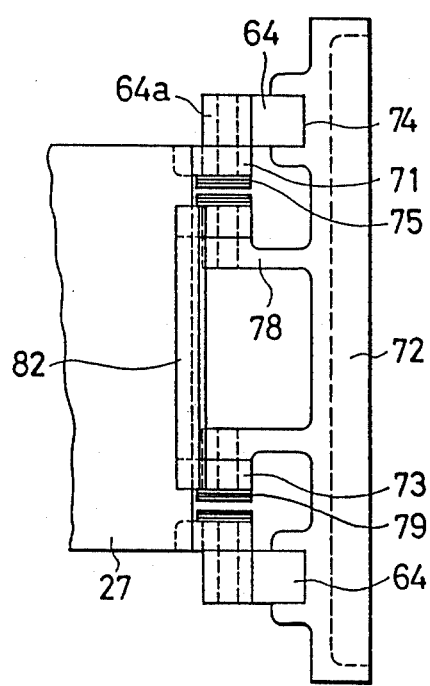
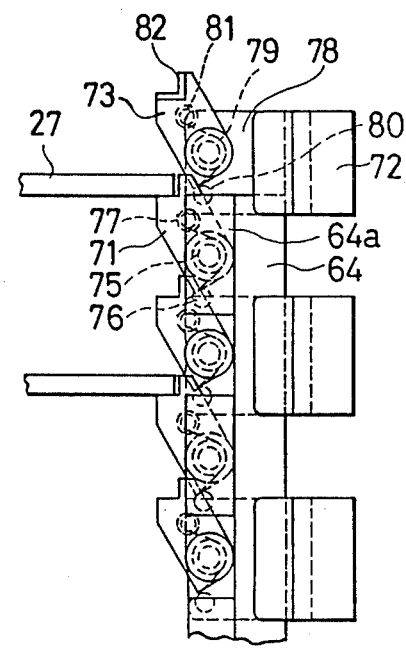

BAKING APPARATUS AND PROCESS

BACKGROUND OF THE INVENTION

1. Field of the Invention

The present invention relates to improvements of apparatus used to make baked goods such as cookies, cakes, bread or rolls and more particularly to a baking apparatus and process suited for installation in a shop to demonstrate or display the baking process for shoppers.

2. Description of the Prior Art

The conventional baking equipment used in a bakery or confectionary factory to bake bread, cookies or cakes includes a conveyor 20 to 60 meters long on which cake and cookie pans are transported. The bread, cakes and cookies are baked by heat sources arranged along the conveyor. This equipment is very large, occupies a large floor space and therefore is not suited for installation in a shop for the purpose of displaying the baking process for shoppers.

To reduce the installation space, moving the pans in the vertical direction has been considered. This, however, requires arranging the heat source outside the vertical pan moving path. The confections or dough on the pan therefore are not located equidistant from the heat source and are not baked uniformly.

In other types of baking equipment the pans are not moved relative to the heat source, as with a home kitchen oven, and consequently a large quantity of confection or dough cannot be baked automatically.

SUMMARY OF THE INVENTION

It is therefore an object of this invention to avoid the above noted drawbacks and to provide a baking apparatus and process which enables automatic and uniform baking of a large quanitiy of dough and requires only a small installation space.

It is a further object of this invention to provide a baking apparatus and a process therefor which is simple to operate, economic, and provides onlookers with a view of the baking process.

Accordingly, this invention provides a baking apparatus which includes an oven having an inlet through which pans carrying the dough are introduced into the oven and an outlet through which pans carrying the completely baked confections are taken out of the oven. Stationary pan receiving members are vertically arranged in multiple layers in the oven. The stationary pan receiving members are adapted to guide the pans laterally and support them. First and second vertical feed members are provided on each side of the stationary multiple-layer pan receiving members. The first and second vertical feed members are adapted to move vertically, in opposite directions, a distance equal to the interval between the stationary pan receiving members. Movable pan receiving members are rigidly secured in multiple layers to the first and second vertical feed members at intervals twice as large as those of the stationary pan receiving members. Lateral feed members are provided to feed the pans laterally when the movable pan receiving members are aligned horizontally with the stationary pan receiving members. Heat sources are arranged between the stationary pan receiving members whereby the pans are made to move up or down in zigzag and pass the heat sources while they are moving horizontally. This process enables the oven to be designed having a vertical structure, while still allowing even baking of the cakes or cookies, thus enabling reduction in the installation area.

These and other objects and advantages of the present invention will become apparent from the following description of the accompanying drawings, which disclose several embodiments of the invention. It is to be understood that the drawings are to be used for the purpose of illustration only, and not as a definition of the invention.

BRIEF DESCRIPTION OF THE DRAWINGS

FIG. 3 is a cross-sectional view taken along line A—A of FIG. 1;

FIG. 4 is a cross-sectional view taken along line B—B of FIG. 1;

FIG. 5 is a cross-sectional view taken along line C—C of FIG. 2;

FIG. 9 is a plan view showing a part of the pan recovery section of the apparatus of the present invention; and FIG. 10 is a side view of the pan recovery section shown in FIG. 9.

DETAILED DESCRIPTION OF THE PREFERRED EMBODIMENT

Figure 6:
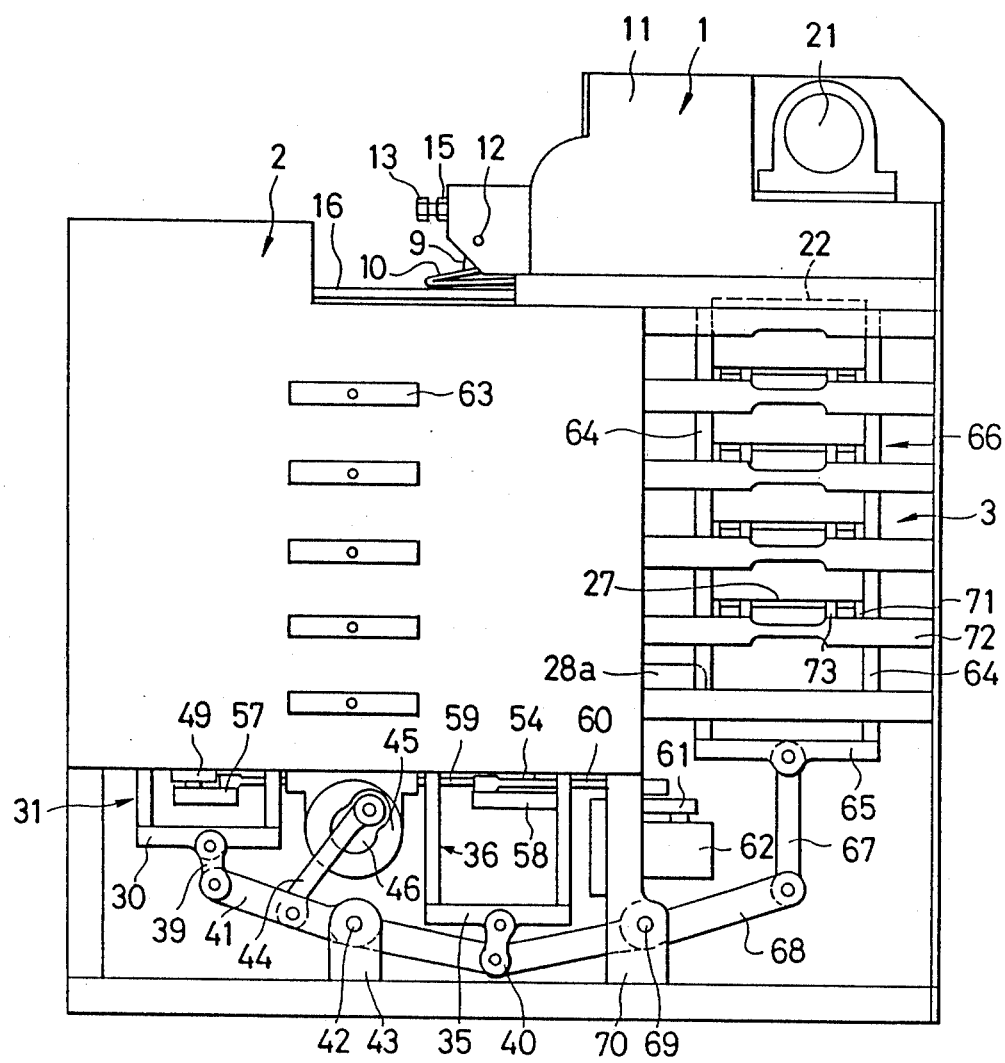
FIG. 6 is a front elevational view showing the external structure of the apparatus of the present invention.
Figure 7:
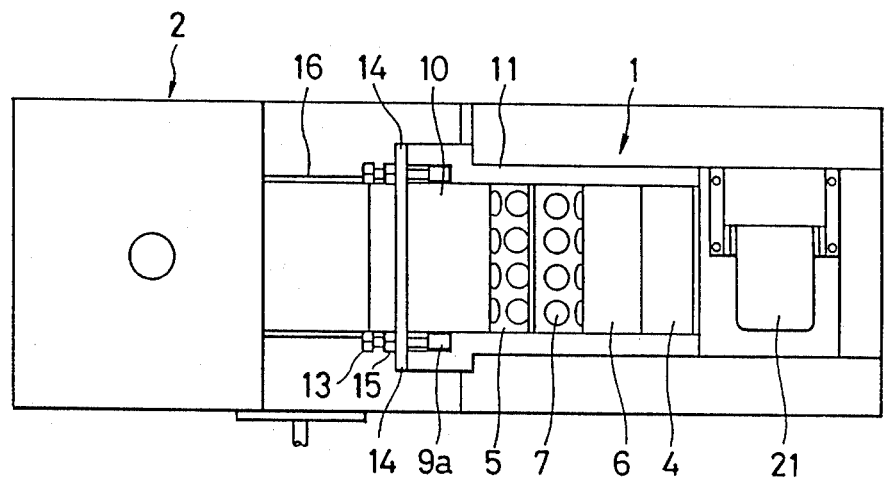
FIG. 7 is a plan view of the apparatus of the present invention shown in FIG. 6.

Referring now to the embodiments illustrated in FIGS. 1–10 and in particular FIGS. 6 and 7 which show the overall structure thereof, the baking apparatus consists of a preparation section 1 in which the dough is shaped into confections such as cakes and cookies. An oven 2 is provided in which the confections are baked. A pan recovery section 3 is included in which the baked confections are taken from the pans carried out from the oven 2 and the empty pans are fed again into the preparation section 1.

Figure 8:
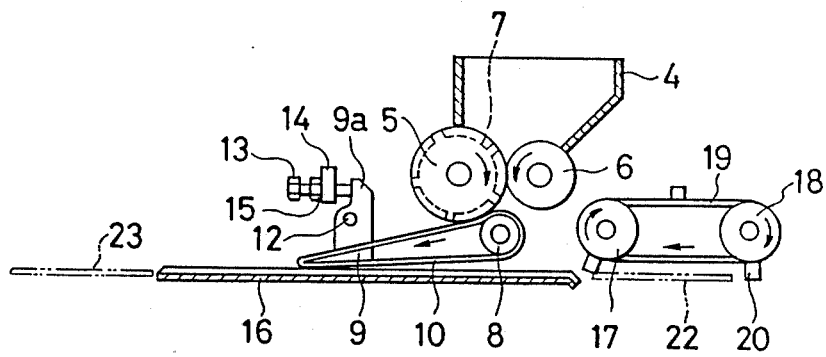
FIG. 8 is a cross-sectional view showing the preparation section of the baking apparatus of the present invention.

As shown in FIG. 8, the preparation section 1 includes a pattern roller 5 and a pressure roller 6 disposed under the hopper 4 in which the raw dough is placed. The pattern roller 5 has a pattern groove 7 to shape the dough into any predetermined form or shape of confection. Below the pattern roller 5 is a belt 10 running between the sprocket 8 and the knife edge 9. The knife edge 9 is rotatably mounted on the shaft 12 which is supported on the frame 11 (FIG. 7), with the end 9a of the knife edge 9 in contact with the front end of the tension bolt 13. The tension bolt 13 is threaded into the mount 14 which is rigidly secured to the frame 11. The bolt 13 is fixed at its position by the nut 15. By loosening the nut 15 and advancing or retracting the tension bolt 13, it is possible to cause knife edge 9 to rotate about the shaft 12 and thereby adjust the tension of the belt 10.

Disposed below the belt 10 is a guide 16 for guiding the pans which has a front end thereof extending into the oven 2 through the oven inlet. The rear part of the guide 16 extends to and below the sprocket 17. A feed chain 19 is arranged between the sprocket 17 and the sprocket 18 and has a plurality of feed claws 20 (in the embodiment shown in FIG. 8, there are 3 claws) at specified intervals.

During the operation of the preparation section 1 the pattern roller 5, pressure roller 6, belt 10 and feed chain 19 are driven in the direction of the arrow in FIG. 8 by the reduction gear motor 21 (FIG. 6 and FIG. 7) through a transmission mechanism made up of sprocket, chain and gears (not shown). A pan is transferred to the initial position 22 as indicated in phantom in FIG. 8 by the pan recovery section 3. The pan at the initial position 22 is fed by the feed claw 20 to the guide 16 and is successfully pushed forward along the guide 16 into the oven 2.

The dough in the hopper 4 is pressed by the pattern grooves 7 of the pattern roller 5 and formed into a desired shape and is then dropped onto the belt 10. The patterned dough is transferred from the belt 10 onto the pan on the guide 16 and further fed to the oven intake position 23 as indicated in phantom in FIG. 8.

Figure 1:
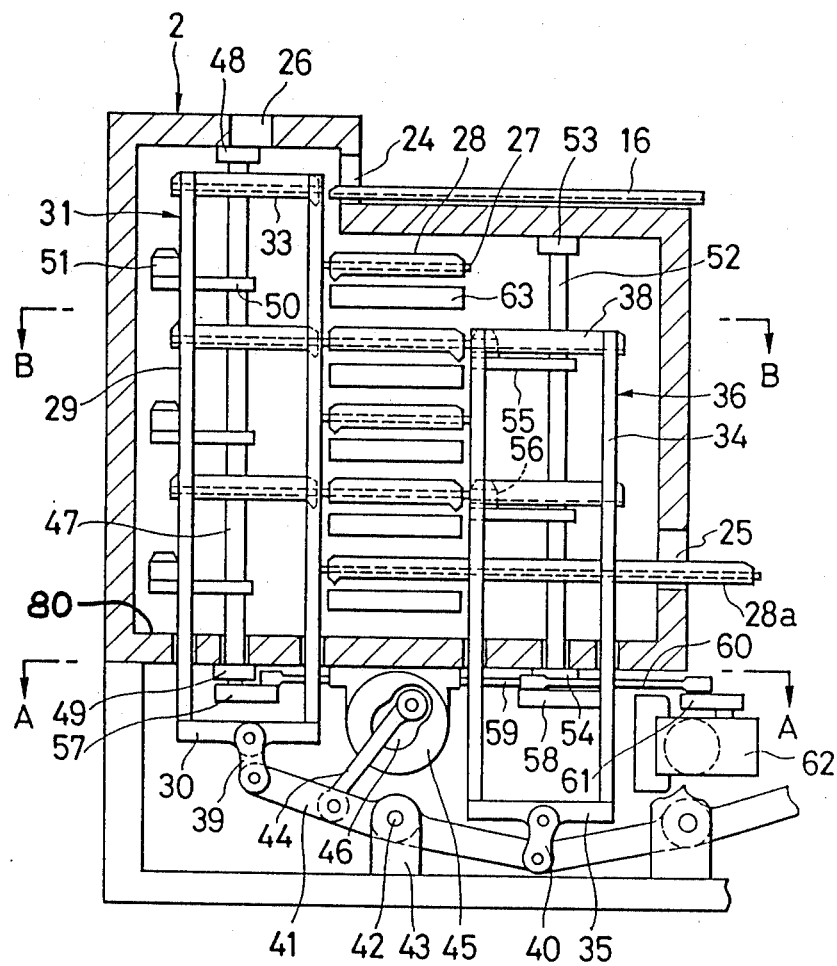
FIG. 1 is a fragmentarily-illustrated front elevational view, in part section, showing the internal structure of the baking apparatus according to one embodiment of the present invention in a first position.

As shown in FIGS. 1 through 5 and particularly in FIG. 1, the oven 2 has a pan inlet 24 at the upper part thereof through which the front part of the guide 16 extends. On one side of the oven 2 there is located a pan outlet 25, and in the ceiling there is an air vent 26.

A plurality of stationary pan receiving members 28 are rigidly arranged vertically in multiple layers in the center of the oven 2 to laterally guide and support the pans 27. The bottom stationary pan receiving member 28 is integrally formed with an extension part 28a that passes through the outlet 25. On the left-hand side of the stationary pan receiving members 28 is located a first vertical feed member 31. Feed member 31 consists of four vertically extending bars 29 and a bearing block 30 and is guided by the vertical guides 32 (FIG. 4) so that it is vertically movable. The vertical guides 32, as shown in FIG. 4, are rigidly secured to the inner walls of the oven 2. The first vertical feed member 31 is provided with movable pan receiving members 33 which are arranged in multiple layers at intervals twice as large as those of the stationary pan receiving members 28. Likewise, on the right-hand side of the stationary pan receiving members 28 is a second vertical feed member 36. Feed member 36 consists of four vertical bars 34 and a bearing block 35 and is guided by the vertical guides 37 (FIG. 4) in such a way that it too can be moved vertically. The vertical guides 37, like the above-mentioned vertical guides 32, are rigidly secured to the inner walls of the oven 2. The second vertical feed member 36 is provided with moving pan receiving members 38 which are arranged in multiple layers at intervals twice as large as those of the stationary pan receiving members 28.

The vertical bars 29 and 34 pass through the bottom wall of the oven 2, and the bearing blocks 30 and 35 are disposed below the bottom wall 80 of the oven 2. The bearing blocks 30 and 35 are coupled to the left and right ends of a lever 41 through links 39 and 40. The lever 41 is rotatably supported by the shaft 42 on the bearing 43 and is also connected to the link 44. The link 44 is further connected to an eccentric disk 46 which is driven by the reduction gear motor 45. The lever 41, the link 44 and the reduction gear motor 45 constitute a vertical drive system for the first and second vertical feed members 31 and 36 and the pan recovery section 3.

On the far side of the movable pan receiving members 33 is disposed a rotating shaft 47 which is rotatably supported on the bearings 48 and 49 at the upper and lower end thereof. The rotating shaft 47 is fixed with a plurality of lateral feed arms 50 each of which has a lateral feed claw 51 at its front end. Similarly, on the far side of the moving pan receiving members 38, a rotating shaft 52 is installed which is rotatably supported by the bearings 53 and 54 at its upper and lower end. The rotating shaft 52 is fixed with a plurality of lateral arms 55 each of which has a lateral feed claw 56 at its front end. The rotating shafts 47, 52, lateral arms 50, 55 and lateral claws 51, 56 combined, form the lateral feed assembly of this invention.

The rotating shafts 47, 52 are coupled to the levers 57, 58 below the bearings 49, 54, as shown in FIG. 3, with the levers 57 and 58 coupled to each other by the link 59. The lever 58 is connected to the worm reduction gear motor 62 through the link 60 and eccentric disk 61. The system, described above from the lever 57 to the worm reduction gear motor 62 constitutes the lateral drive system that drives the lateral arms 50, 55 simultaneously in the same direction; note that lateral feed arms 50 and 55 and lateral claws 51, 56 are not horizontally aligned. In the embodiment shown in FIGS. 1 and 2, three feed arms 50 alternate with two feed arms 55 with the interval therebetween equal to the interval between stationary pan receiving members 28. Thus pans 27 follow the same path through the oven 2 with pans 27 always passing over the lowermost pan receiving member 28 in the left to right direction of FIGS. 1 and 2.

Between the stationary pan receiving members 28 are disposed heat sources 63 which are long enough to cover the pan 27. The heat source 63 uses electricity or gas as its heat energy and preferably produces far-infared radiation. Though not shown, the heat source 63 is removably mounted to the oven 2.

Figure 2:
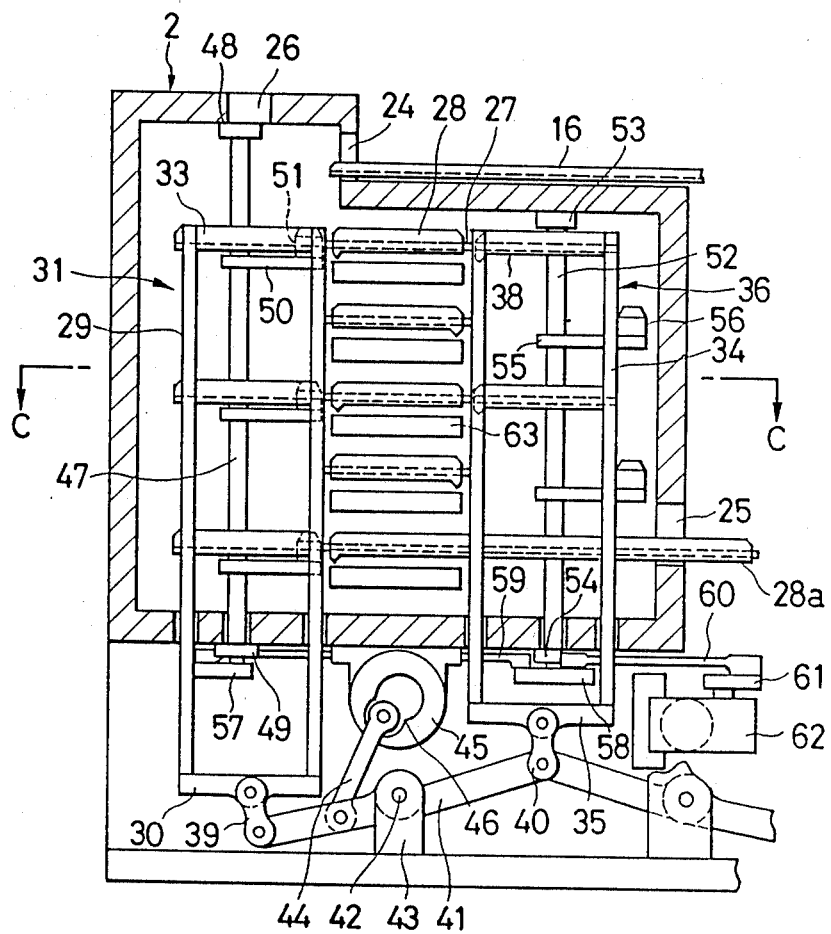
FIG. 2 is a front elevational view similar to FIG. 1, but showing the internal structure of the baking apparatus in a second position.

Next, the operation of oven 2 will be explained. FIG. 1 shows the first vertical feed member 31 at the up or highest position and the second vertical fed member 36 at the down or lowest position. In this condition, the lateral feed arms 55 are shown to have completed the left feed operation in FIG. 4. FIG. 2 shows the first vertical feed member 31 at the down or lowest position and the second vertical feed member 36 at the up or highest position. In this condition, the lateral arms 50 are shown, in FIG. 5, to have completed the right feed operation.

As the reduction gear motor 45 drives the eccentric disk 46 lifting the left side of the lever 41, the first and second vertical feed members 31 and 36 assume their positions as shown in FIG. 1. The uppermost movable pan receiving member 33 is flush with the guide 16; the second highest movable pan receiving member 33 and the uppermost movable pan receiving member 38 are flush with the second highest stationary pan receiving member 28; and the third movable pan receiving member 33 and the second movable receiving pan member 38 are flush with the fourth stationary pan receiving member 28. In this condition, as the worm reduction gear motor 62 is started and the rotating shafts 47, 52 are turned clockwise, the lateral feed arms 50,55 are rotated from the position of FIG. 5 to the position of FIG. 4. As a result, the lateral feed claws 56 push the pans 27 to the left, moving the pans 27 from the movable pan receiving members 38 onto the the stationary pan receiving members 28 and the pans 27 from the stationary pan receiving members 28 onto the movable pan receiving members 33. The pan 27 at this time is shown at the intake position 23 of FIG. 8.

Next, when the eccentric disk 46 rotates pushing down the left side of the lever 41, the vertical feed members 31, 36 assume the positions of FIG. 2. That is, the uppermost movable pan receiving member 33 and the uppermost movable pan receiving member 38 are aligned with the uppermost stationary pan receiving member 28; the second movable pan receiving member 33 and the second movable pan receiving member 38 are also aligned with he third stationary pan receiving member 28; and the third movable pan receiving member 33 is aligned with the fifth stationary pan receiving member 28. In this condition, as the worm reduction gear motor 62 is driven in the reverse direction and the shafts 47, 52 are turned counterclockwise, the lateral feed arms 50, 55 are rotated from the position of FIG. 4 to that of FIG. 5. As a result, the lateral feed claws 51 push the pans 27 to the right, transferring the pans 27 from the movable pan receiving members 33 onto the stationary pan receiving members 28 and the other pans 27 from the stationary pan receiving members 28 onto the movable pan receiving members 38.

Repetitive operation of the above process results in a series of pans moving down in zigzag and passing the heat sources 63 while moving horizontally. Since the heat source 63 heats the pan evenly along the width, the confections or dough on the pan is baked uniformly. The pan 27 carrying the baked confections is pushed out of the oven 2 from the extension 28a of the lowest stationary pan receiving member 28 and then enters the pan recovering section 3. The time intervals between each repetitive operation is determined by the time necessary to bake the dough within the oven. These time intervals are determined based on the characteristics of the raw dough, the energy output of the heating elements, and the temperatures within the oven.

The pan recovery section 3, as shown in FIG. 6, has a third vertical feed member 66 consisting of four vertical bars 64 and a bearing block 65. The bearing block 65 is coupled to the right-hand of the lever 68 through link 67. The lever 68 is rotatably supported by the shaft 69 on the stay or support 70 and has its left end coupled to the right end of the lever 41. The third vertical feed member 66 moves up and down in response to the movement of the first and second vertical feed members 31, 36. The bars 64 of vertical feed member 66 are guided by guide members 72.

The vertical bars 64, as shown in FIGS. 9 and 10, are provided with a plurality of up-feed claws 73 which correspond to the up-feed claws 71. The details of this structure are shown in FIGS. 9 and 10. The guide member 72 has guide grooves 74 in which the vertical bars 64 are slidably installed. On the inner side of the mounting portion 64a of the vertical bar 64, the up-feed claw 71 is rotatably mounted and is urged counterclockwise by the spring 75 acting on hook 77 of FIG. 10. The counterclockwise rotation of the up-feed claw 71 is blocked by a stopper 76. The spring 75 is engaged at its ends with the stopper 76 and the spring hook 77.

Each of the guide members 72 has two stationary claw mounting portions 78 on which the stationary claws 73 are rotatably mounted. The stationary claw 73 is urged counterclockwise in FIG. 10 by the spring 79 acting on hook 81, as with the up-feed claw 71, and its rotation is blocked by a stopper 80. The spring 79 is engaged at its ends with the stopper 80 and the spring hook 81. Only the uppermost stationary claws 73 are attached with an L-shaped receptor 82.

The operation of the pan recovery section 3 is as follows.

When the first vertical feed member 31 is at the down or lowest position, the third vertical feed member 66 is also at the down position. In this condition, the pan 27 carried out from the outlet 25 of the oven 2 is put on the lowest up-feed claws 71. At this time, other up-feed claws 71 are aligned with the stationary claws 73 except for the uppermost stationary claws 73 and carry the pans 27 which are supported on the stationary claws 73. As the third vertical feed member 66 starts moving up, the up-feed claws 71 carry the pans 27 upward. FIG. 10 illustrates the third vertical feed member 66 in the process of moving up. During the process, when the pan 27 strikes the next higher stationary claws 73, it rotates the stationary claws 73 clockwise against the force of the springs 79, moving past the stationary claws 73 one stage higher, they stop there. At this time, the position of the pan 27 supported on the uppermost stationary claws 73 is the initial position 22 for the pan 27. As described earlier, the pan 27 at this position 22 is fed to the guide 16 by the feed claw 20 (FIG. 8). When the third vertical feed member 66 moves down, the pans 27 are left on the stationary claws 73 with only the up-feed claws 71 go down to the position where they are aligned with the stationary claws 73 one stage lower. The up-feed claws 71, during the process of moving down, strike the pans 27 supported on the stationary claws 73 one stage lower, but rotate clockwise against the force of the springs 75 clearing these pans 27.

As the above vertical movement is repeated, the pan 27 moves up the series of stationary claws 73 one stage at a time until it arrives at the initial position 22. The fully baked confections on the pan 27 are taken out from the space between the guide members 72 at an appropriate position.

With this embodiment, since the path of the pans 27 in the oven 2 are made zigzag, the oven can be designed to have a vertical structure and thereby reduce the installation area. Also since the pans 27 are heated by the heat sources 63 during lateral movement, the confections on the pan 27 can be baked uniformly. The moving of pans 27 during baking also enables a large quantity of confection to be baked automatically.

Although in the above embodiment the pans 27 are made to move down in the oven 2, it is also possible to move them upward during baking process. The length of the stationary pan receiving member 28 may be other than the length of one pan 27 and be set to cover several pans.

While in the above embodiment the pan 27 is first transferred onto the movable pan receiving member 33, it may be transferred first onto the stationary pan receiving member 28.

The structure of the preparation section 1 and the pan recovery section 3 are not restricted to the one employed in the embodiment.

The foregoing description is illustrative of the present invention and various modifications and embodiments have been suggested and others will be readily apparent to those skilled in the art. While only several embodiments and examples of the present invention have been described, it is obvious that many changes and modifications may be made thereunto, without departing from the spirit and scope of the invention.

What is claimed is:

1. A process for baking dough arranged on a series of horizontally oriented pans which travel in series through an oven and having a plurality of vertically arranged stationary baking platforms therein, said process comprising:

introducing said pans in series in a first horizontal direction onto a first of said plurality of stationary vertically aligned baking platforms;

moving said pan off said first stationary baking platform by the movement in said first horizontal direction of the immediately following pan in series onto said first baking platform;

vertically moving said pan into horizontal alignment with a second of said plurality of vertically aligned stationary baking platforms;

moving said pan in a second horizontal direction parallel to said first direction onto said second platform of said plurality of vertically aligned baking platforms;

moving said pan off said second baking platform by the movement in said second horizontal direction of the immediately following pan in series onto said second baking platform;

moving said pans vertically in series to be horizontally aligned with each of said plurality of baking platforms whereby the horizontal movement in said first and second horizontal directions moves each of said pans in series onto said plurality of stationary baking platforms and whereby each succeeding pan moves in series each preceding pan off of said baking platform;

baking said pans on each of said plurality of baking platforms with heat sources associated with each of said plurality of baking platforms for a predetermined time whereby the combined time spent by each pan on each of said baking platforms thereby produces a properly baked dough; and moving each of said pans in series in one horizontal direction across the last of said plurality of stationary baking platforms whereby the horizontal movement in series of each of said baking pans causes a preceding pan to exit from said oven.

2. A baking apparatus comprising:

an oven having an inlet through which pans enter and an outlet through which pans exit;

stationary pan receiving members vertically arranged in layers spaced at predetermined intervals within the oven, the stationary pan receiving members being adapted to laterally guide and support the pans;

first and second vertical feed members disposed on opposite sides of said stationary pan receiving members, said first and second vertical feed members being adapted to move vertically in opposite directions the distance equal to said predetermined intervals between said stationary pan receiving members, said first and second vertical feed members each consisting of four vertical bars and a bearing block for connecting the vertical bars to a vertical drive system, said vertical bars having lower ends passing through a bottom of said oven with said bearing blocks situated below said oven;

movable pan receiving members attached in layers to the first and second vertical feed members at intervals twice as large as the predetermined intervals of the stationary pan receiving members;

lateral feed members to move the pans laterally when the movable pan receiving members are aligned horizontally with the stationary pan receiving members; and heat sources disposed between the stationary pan receiving members.

3. A baking apparatus as set forth in claim 1, wherein said inlet is provided at the upper part of the oven and said outlet is provided at the lower part of the oven.

4. A baking apparatus as set forth in claim 1, wherein said vertical bars are guided along vertical guides rigidly secured to inner walls of the oven.

5. A baking apparatus as set forth in claim 1, wherein said vertical drive system includes an oscillating lever whioh is supported at its center by a bearing and which has left and right ends; and connection means for linking respective ends of said oscillating lever to said bearing blocks of said first and second vertical feed members.

6. A baking apparatus as set forth in claim 1, wherein said lateral feed members consist of vertical rotating shafts adjacent said movable pan receiving members, a plurality of lateral feed arms rigidly secured to said rotating shafts at specified intervals, and lateral feed claws provided to the front ends of said lateral feed arms.

7. A baking apparatus as set forth in claim 6, wherein said rotating shafts are coupled to a lateral drive system capable of turning said rotating shafts in the same direction simultaneously.

8. A baking apparatus as set forth in claim 1, further comprising a preparation section means and a pan recovery section means, the preparation section means being adapted to load into the oven through said inlet, pans having dough shaped into desired forms, the pan recovery section means being adapted to transport said pans exiting from the oven through said outlet thereof and to return empty pans to the preparation section means.

9. A baking apparatus comprising:

an oven having an inlet through which pans enter and an outlet through which pans exit;

stationary pan receiving members vertically arranged in layers within said oven spaced at predetermined intervals within the oven, the stationary pan receiving members being adapted to laterally guide and support the pans;

first and second vertical feed members disposed within said oven on opposite sides of said stationary pan receiving members, said first and second vertical feed members being adapted to move vertically in opposite directions the distance equal to said predetermined intervals between said stationary pan receiving members;

movable pan receiving members attached in layers to the first and second vertical feed members at intervals twice as large as the predetermined intervals of the stationary pan receiving members;

lateral feed members to move the pans laterally when the movable pan receiving members are aligned horizontally with the stationary pan receiving;

heat sources disposed between the statonary pan receiving members; and means for moving said pans off of said moveable pan receiving members and through said outlet whereby said moveable pan receiving members remain within said oven.

* * * * *